United States Patent Office 3,512,612
Patented May 19, 1970

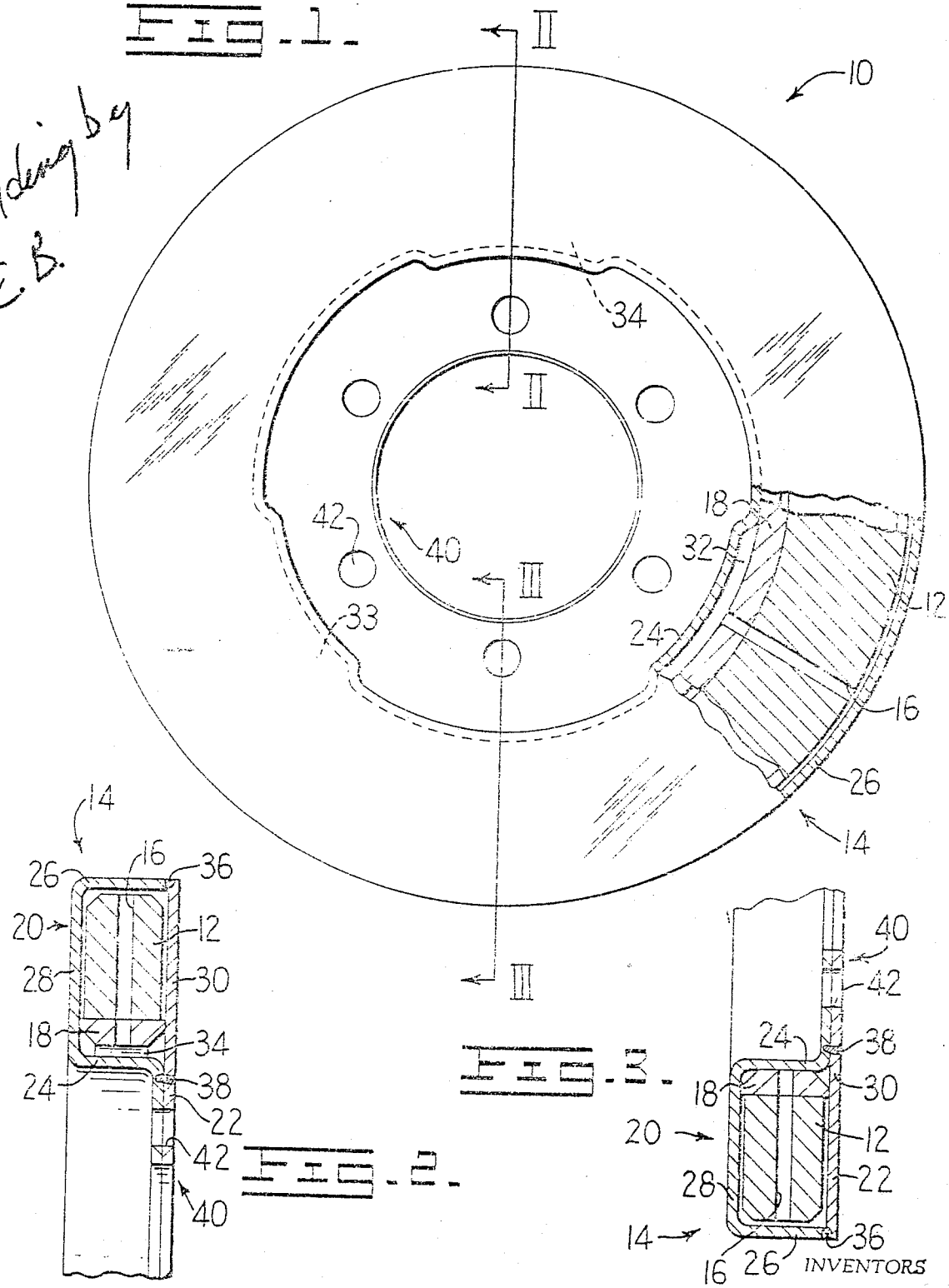

3,512,612
TORSIONAL VIBRATION DAMPER
Gary O. Bragg, Peoria, and Robert I. Wilson, Peoria Heights, Ill., assignors to Caterpillar Tractor Co., Peoria, Ill., a corporation of California
Continuation of application Ser. No. 658,743, Aug. 7, 1967. This application July 25, 1969, Ser. No. 847,809
Int. Cl. F16d 63/00
U.S. Cl. 188—1
10 Claims

ABSTRACT OF THE DISCLOSURE

A torsional vibration damper having an annular housing constructed of a hydroformed channel member and a cover secured by electron beam welding to the channel member, the channel member providing an axially-extending wall formed with a plurality of circumferentially-spaced-apart recesses providing reservoir space for viscous fluid.

---

This application is a continuation of Ser. No. 658,743 filed Aug. 7, 1967, now abandoned.

Torsional vibration dampers are presently used for such purposes as damping the torsional vibration of an internal combustion engine. One type of such damper is known as a viscous vibration damper. It comprises an annular inertia weight disposed for relative rotation within an annular housing which is fixed to an engine crankshaft for rotation therewith. The space, usually a few thousandths of an inch, between the weight and housing is filled with a viscous fluid of which silicon is a prominent example, and the resistance to shear of the film of viscous fluid between the surfaces of the weight and housing produces a damping effect. Bearings are sometimes provided to support the weight relative to the housing to maintain concentricity of the relatively moving parts and prevent destructive contact of one with the other and consequent breaking down and solidification of the viscous component.

The known dampers have been expensive to manufacture and assemble, largely due to the types of housing employed. Such housings have commonly been constructed in a manner requiring a substantial amount of machining. A particular problem has existed with respect to the formation of the reservoir for the viscous fluid. Separate machining operations have usually been required for forming the reservoir after the remainder of the housing has been formed.

A further problem has existed as a consequence of the fact that the type of reservoir commonly employed has been annular in shape, extending for the full length of one of the annular housing walls.

The present invention is designed to overcome the above discussed problems of the prior art. The advantages of the present invention will become apparent to one skilled in the art from the following description thereof when read in conjunction with the accompanying drawing, in which:

FIG. 1 is an end elevational view being partly broken away of a torsional vibration damper constructed in accordance with the invention;

FIG. 2 is a cross-sectional view taken along the lines II—II of FIG. 1; and

FIG. 3 is a cross-sectional view taken along the lines III—III of FIG. 1.

In the drawing, there is shown a torsional vibration damper 10 providing an inertia weight 12 disposed in an annular housing 14. The inertia weight 12 is preferably provided with a plurality of radial passages 16 (FIG. 2) and is guided within the housing 14 to prevent direct contact between the weight and the housing by an annular pilot bearing or bushing 18 disposed between the weight and the housing in a manner to provide clearance between the weight and housing on all sides.

The housing 14 is formed of a channel-shaped member 20, a cover 22 which together provide a pair of opposed axially-extending walls 24, 26 and a pair of opposed radially-extending walls 28, 30.

The inner axial wall 24 is formed with three recesses 32, 33 and 34 providing reservoir space for viscous fluid which, under centrifugal action, will pass outwardly through the radial passages 16 and completely fill the clearance adjacent the outer periphery and both sides of the inertia weight. The recesses 32, 33 and 34 extend the full width of the wall 24 and are circumferentially spaced apart along the wall. The bushing 18 is supported by the portions of the wall 24 lying between the recesses 32, 33 and 34.

The member 20 is preferably fabricated by a conventional hydroforming process. The cover 22 is secured to the wall 26 by electron beam welding such as seen at 36. Electron beam welding is also provided as seen at 38, in a bolting flange 40, forming by adjacently positioned extension flanges of the member 20 and cover 22. The flange 40 is provided with a plurality of bores 42 for receiving connected members for securing the damper to the crankshaft of an engine (not shown).

The damper 10 is unusually economical to manufacture, and unusually easy to assemble. At the same time a high quality of service is provided. These advantages result primarily from the method of fabricating the member 20 by hydroforming, and the use of electron beam welding as the means of securing together the member 20 and the cover 22. Through the use of hydroforming, close tolerances are obtained while at the same time many of the machining operations which would otherwise be required are eliminated. In addition, the recesses 32, 33 and 34 are formed simultaneously with the remainder of the member 20. The shape and positioning of the recesses simplifies the problem of die removal.

The use of electron beam welding eliminates the distortion that is usually associated with more conventional types of welding and also provides a comparatively deep penetration of materials such as is particularly required for the weld 38. In addition, electron beam welding is accomplished without the use of additional materials, such as are often required with other types of welding.

What is claimed is:

1. A torsional damper comprising a housing having opposed, axially extending inner and outer walls and opposed, radially extending walls secured to said inner and outer walls to define a closed, annular chamber in said housing, said inner wall having a plurality of circumferentially spaced-apart, raised surface portions formed thereon to provide a recess between each pair of adjacent raised surface portions adapted to retain a viscous fluid therein, an annular bearing disposed in said chamber and mounted on the raised surface portions of said inner wall, an annular inertia weight disposed in said chamber and mounted on said bearing to provide clearances between said inertia weight and the outer and radially extending walls of said housing, and passage means for communicating viscous fluid from said recesses to said clearances.

2. The invention of claim 1 wherein each of said recesses extends the full axial width of said inner wall.

3. The invention of claim 1 comprising three of said raised surface portions substantially equally spaced circumferentially around said inner wall.

4. The invention of claim 1 wherein said housing comprises a formed channel member providing said inner and outer walls and one of said radially extending walls.

5. The invention of claim 4 wherein said other radially extending wall comprises a cover secured to said channel member by circumferential electron beam weld means for preventing distortion of said housing.

6. The invention of claim 5 wherein said cover is flat.

7. The invention of claim 5 wherein said channel member and said cover are each formed with a radially inwardly disposed extension flange, said extension flanges being secured together by circumferentiial electron beam weld means.

8. The invention of claim 1 wherein said passage means comprises a plurality of radially disposed passage means formed through said bearing and said inertia weight.

9. In a torsional damper comprising a housing defining a closed annular chamber therein, an annular bearing disposed in said chamber and an annular inertia weight disposed in said chamber and mounted on said bearing to provide clearances between said inertia weight and said housing, the invention comprising a plurality of circumferentially spaced-apart, raised surface portions formed on said housing to project radially outwardly into said chamber to provide a recess between each pair of adjacent raised surface portions adapted to retain a viscous fluid therein, said bearing mounted on the raised surface portions of said housing, and passage means for communicating viscous fluid from said recesses to the clearances provided between said inertia weight and said housing.

10. The invention of claim 9 wherein said passage means comprises a plurality of radially disposed passage means formed through said bearing and said inertia weight.

References Cited

UNITED STATES PATENTS

| | | |
|---|---|---|
| 2,514,138 | 7/1950 | O'Connor. |
| 2,724,983 | 11/1955 | O'Connor. |

FOREIGN PATENTS

| | | |
|---|---|---|
| 1,338,618 | 8/1963 | France. |
| 920,642 | 3/1963 | Great Britain. |

DUANE A. REGER, Primary Examiner

U.S. Cl. X.R.

188—101